United States Patent
Thompson

(10) Patent No.: US 6,242,876 B1
(45) Date of Patent: Jun. 5, 2001

(54) INTERMITTENT WINDSHIELD WIPER CONTROLLER

(75) Inventor: Peter Hatch Thompson, Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 08/485,682

(22) Filed: Jun. 7, 1995

(51) Int. Cl.[7] .................................................. H02P 1/04

(52) U.S. Cl. ........................................................... 318/444

(58) Field of Search ................................... 318/443, 444, 318/DIG. 2; 15/250.12, 250.13, 250.16

(56) References Cited

U.S. PATENT DOCUMENTS

| | | | |
|---|---|---|---|
| Re. 33,308 | 8/1990 | Millerd et al. | 318/444 |
| Re. 33,848 | 3/1992 | Shiraishi | 318/444 |
| 3,579,067 | * 5/1971 | Riester | 318/444 |
| 3,864,578 | 2/1975 | Lackey | 307/10 R |
| 4,055,772 | 10/1977 | Leung | 307/10 R |
| 4,241,444 | 12/1980 | Kister | 370/85 |
| 4,251,898 | * 2/1981 | Reichard | 15/250.1 |
| 4,290,134 | 9/1981 | Hampshire | 370/92 |
| 4,339,698 | * 7/1982 | Kearns | 318/444 |
| 4,370,561 | 1/1983 | Briggs | 307/9 |
| 4,388,574 | 6/1983 | Bois et al. | 318/443 |
| 4,431,954 | 2/1984 | Carpenter et al. | 318/443 |
| 4,492,904 | 1/1985 | Graham | 318/444 |
| 4,544,870 | 10/1985 | Kearns et al. | 318/444 |
| 4,547,716 | 10/1985 | Johnson et al. | 318/443 |
| 4,578,591 | 3/1986 | Floyd et al. | 307/10 R |
| 4,584,487 | 4/1986 | Hesse et al. | 307/10 R |
| 4,588,935 | 5/1986 | Kaneiwa et al. | 318/483 |
| 4,614,903 | * 9/1986 | Betsch et al. | 318/443 |
| 4,620,141 | 10/1986 | McCumber et al. | 318/483 |
| 4,625,157 | 11/1986 | Phillimore | 318/443 |
| 4,634,944 | 1/1987 | Hastings et al. | 318/443 |
| 4,663,575 | 5/1987 | Juzswik et al. | 318/444 |
| 4,689,535 | 8/1987 | Tsunoda et al. | 318/443 |
| 4,825,134 | 4/1989 | Tracht | 318/443 |
| 4,827,198 | 5/1989 | Mueller et al. | 318/483 |
| 4,851,745 | 7/1989 | Ponziani | 318/443 |
| 4,859,867 | 8/1989 | Larson et al. | 307/10.1 |
| 4,873,451 | 10/1989 | Pristerá et al. | 307/10.1 |
| 4,916,374 | 4/1990 | Schierbeek et al. | 318/483 |
| 4,942,349 | 7/1990 | Millerd et al. | 318/483 |
| 4,942,571 | 7/1990 | Möller et al. | 370/85.1 |
| 4,947,092 | * 8/1990 | Nabha et al. | 318/444 |
| 4,960,996 | 10/1990 | Hochstein | 250/349 |
| 4,965,725 | 10/1990 | Ratenberg | 364/413.1 |
| 5,015,931 | 5/1991 | Muller | 318/483 |
| 5,030,899 | 7/1991 | Nishibe et al. | 318/444 |
| 5,057,754 | 10/1991 | Bell | 318/483 |
| 5,059,877 | 10/1991 | Teder | 318/444 |
| 5,117,168 | 5/1992 | Nomura et al. | 318/444 |
| 5,119,002 | 6/1992 | Kato et al. | 318/444 |
| 5,140,234 | 8/1992 | Wallrafen | 318/264 |
| 5,166,587 | 11/1992 | Smart | 318/444 |
| 5,200,676 | 4/1993 | Mueller et al. | 318/444 |
| 5,216,341 | 6/1993 | Nomura et al. | 318/444 |
| 5,239,244 | 8/1993 | Teder | 318/444 |
| 5,245,259 | 9/1993 | Nakamura et al. | 318/443 |
| 5,252,897 | * 10/1993 | Porter et al. | 318/443 |

(List continued on next page.)

Primary Examiner—Jonathan Wysocki
(74) Attorney, Agent, or Firm—Jacox, Meckstroth & Jenkins

(57) ABSTRACT

Windshield wiping systems commonly include a parking control, which delivers power to a wiping motor, while waiting for the wipers to reach a parked position. When the wipers park, the parking control terminates power to the motor. The invention repeatedly exercises the parking control, in order to obtain intermittent wiper operation. That is, the invention allows parking to occur, and then waits for a short time. Next, the invention withdraws a wiper from parked status, and then allows the parking system to park again, and so on.

4 Claims, 8 Drawing Sheets

U.S. PATENT DOCUMENTS

| | | | |
|---|---|---|---|
| 5,256,950 | 10/1993 | Matsumoto et al. | 318/443 |
| 5,262,640 | 11/1993 | Purvis et al. | 250/227.25 |
| 5,302,007 | 4/1994 | Morita et al. | 303/9.73 |
| 5,304,936 | 4/1994 | Buschur | 324/689 |
| 5,306,992 | 4/1994 | Dröge | 318/483 |
| 5,331,257 | 7/1994 | Materne et al. | 318/85 |
| 5,355,061 | 10/1994 | Forhan | 318/443 |
| 5,404,085 * | 4/1995 | Resch et al. | 318/443 |
| 5,453,676 | 9/1995 | Agrotis et al. | 318/643 |

* cited by examiner

PARKED POSITION
SWITCH CLOSED

SWITCH OPEN

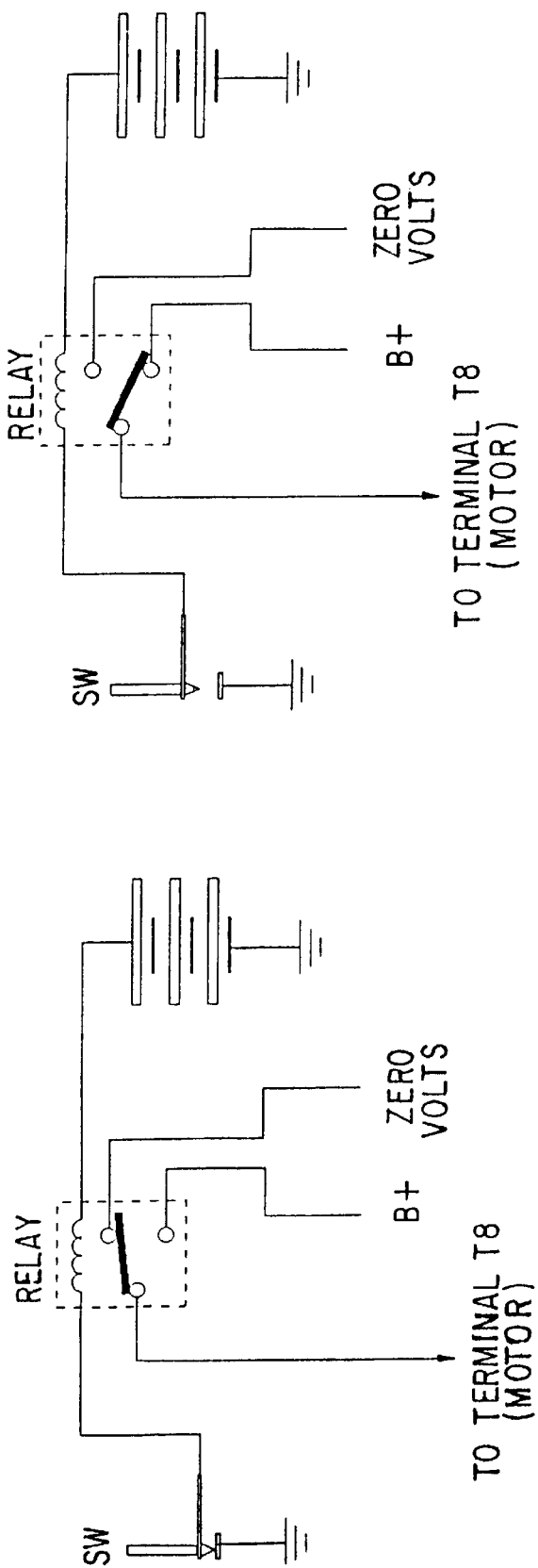

INTERMITTENT WINDSHIELD WIPER CONTROLLER

The invention concerns a control for a windshield wiper, which runs the wiper intermittently.

BACKGROUND OF THE INVENTION

Windshield Wipers are Parked When Not in Use

Many prior-art windshield wipers include a parking system, which parks the wipers, and then terminates power to the wiper motor. A generalized wiper will be illustrated, followed by a simplified, generalized parking system.

Simplified Example of Wiper

FIG. 1A illustrates a windshield wiper. A crank C, driven by a motor (not shown) rotates, as indicated by the arrow. The crank C drives a linkage L which causes a wiper ARM to reciprocate about a PIVOT between the positions shown in FIGS. 1A and 1B. (Modern wiper systems are significantly more complex than FIGS. 1A and 1B indicate, but the principles of these Figures nevertheless are applicable.)

When the wiper is not in use, the ARM resides in the parked position of FIG. 1A. However, the ARM is not placed into the parked position by intentional manipulation by the driver of the vehicle. One reason is that, during wiping, the ARM is moving, and the ARM-motor-linkage system has inertia. To stop the moving ARM in the parked position, the driver must stop the motor at exactly the proper time, and let the wiper coast, by inertia, into the parked position. This task would distract the driver from his driving responsibilities. Consequently, electronic circuits have been developed which perform the parking task.

One Way to Park

In a simplified sense, the parking circuit utilizes a limit switch SW, shown in FIG. 2. When the ARM resides in the parked position, the limit switch SW is closed, as in FIG. 2. When the ARM resides in its operating region, as in FIG. 3, the switch SW is open.

FIG. 2A gives a simplified explanation of how parking can be accomplished. When the switch SW is open (as when the ARM resides in the operating region), as shown on the right of FIG. 2A, the switch SW causes a RELAY to deliver battery voltage, B+, to the wiper MOTOR. The MOTOR remains running.

When switch SW closes (as when the ARM reaches the parked position), the RELAY in FIG. 2A switches states, and delivers ZERO volts to the MOTOR. The MOTOR stops. The wipers park.

Parking System Is Somewhat Redundant

Some wiping systems exist which provide intermittent operation of the wipers, for use in light rain. Such systems contain certain components, such as relays, which are also contained in the parking system.

These components are redundant, because the intermittent system and the parking system are never used simultaneously. For example, the relays in the parking system and in the intermittent system never operate together.

The Inventor has developed an approach to reducing, or eliminating, this redundancy, to reduce cost.

OBJECTS OF THE INVENTION

An object of the invention is to provide an improved controller for a windshield wiper.

A further object of the invention is to provide an intermittent wiper system, which utilizes functionality of a parking system, in order to conserve parts.

SUMMARY OF THE INVENTION

In one form of the invention, to attain intermittent wiping action, a wiper is first allowed to park. Then, after a time delay, the wiper is withdrawn from the parked position, and allowed to park again. Repetition of this process (park, delay, withdrawal . . . park, delay, withdrawal) produces intermittent wiping.

BRIEF DESCRIPTION OF THE DRAWINGS

FIG. 2A illustrates part of a parking system.

DETAILED DESCRIPTION OF THE INVENTION

Overview

Windshield wiping systems generally include parking systems for the wipers. When the driver of a vehicle turns the wiper switch OFF, the parking system takes over. The parking system causes the wiper motor to continue to run, but also senses whether the wipers have reached parked position. When they do, the parking system terminates power to the motor, leaving the wipers in the parked position.

One form of the invention may be viewed as adding another function to the parking function. In the added function, after the wipers park, they are allowed to remain parked temporarily. Then, the wipers are withdrawn from the parked position (by actuating the motor). Next, control is returned to the parking system, which parks them again.

Thus, the following sequence is executed:

park, delay, withdraw;

park, delay, withdraw; and so on.

This sequence produces intermittent wiping. FIG. 4A is a block diagram which illustrates logic which implements this sequence. In this Figure, the variable N, located at the top, is either fixed, or is a variable under the control of the vehicle driver.

Also, the PARKING SYSTEM is entered in two ways: (1) from the block START MOTOR (during intermittent wiping) and (2) from the block START (during shut-down of the wipers).

Numerous different types of hardware can be designed which execute this logic. For example, a microprocessor, together with proper sensors (to detect parking) can be programmed to execute the logic. The following discussion will explain one type of hardware developed by the Inventor.

One Embodiment

Normal Running Mode

Figure 4:
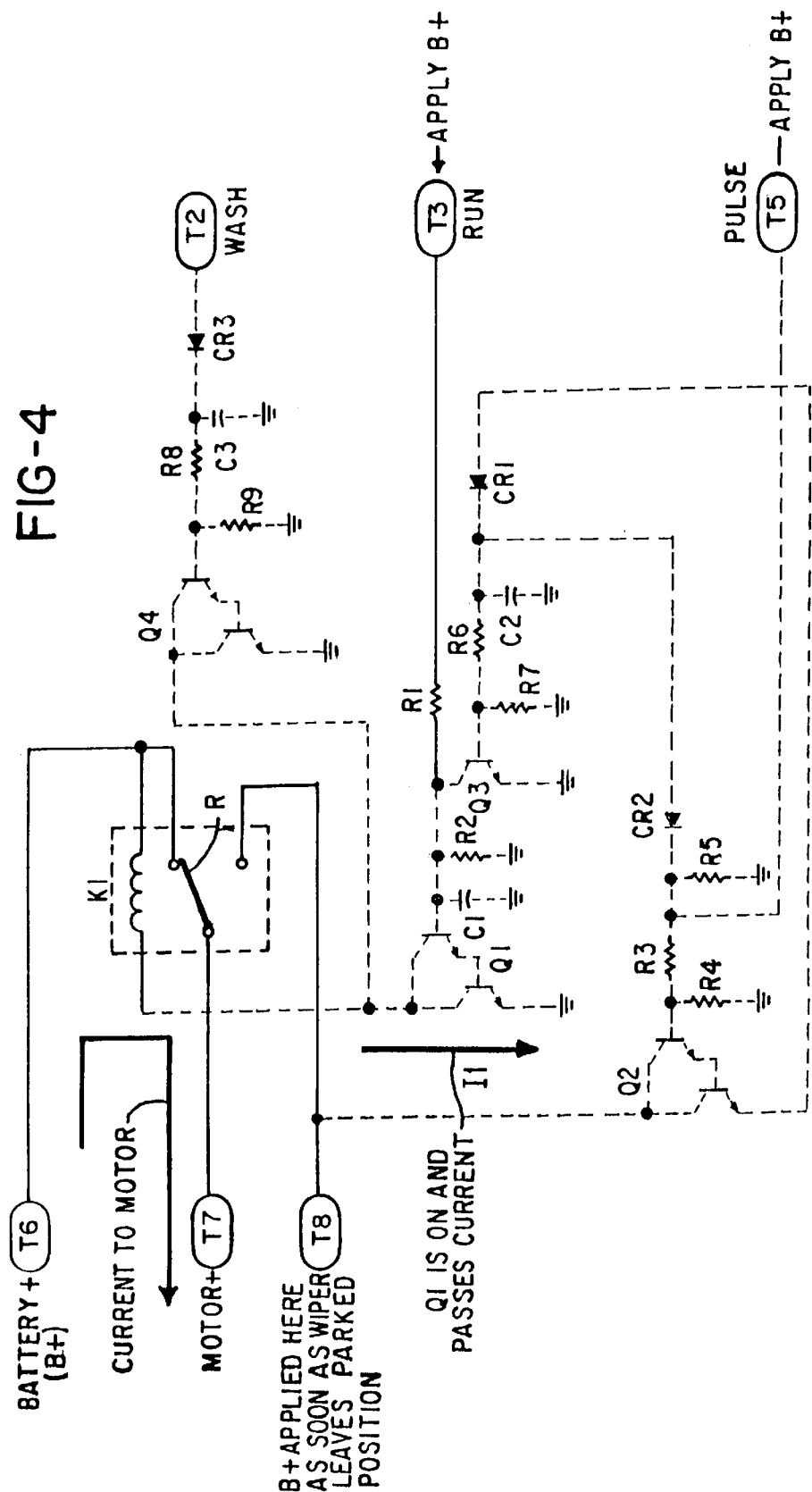
FIGS. 4–7 illustrate a circuit which implements one form of the invention. Each Figure emphasizes different parts of the circuit, to explain different stages of operation.
Figure 4A:
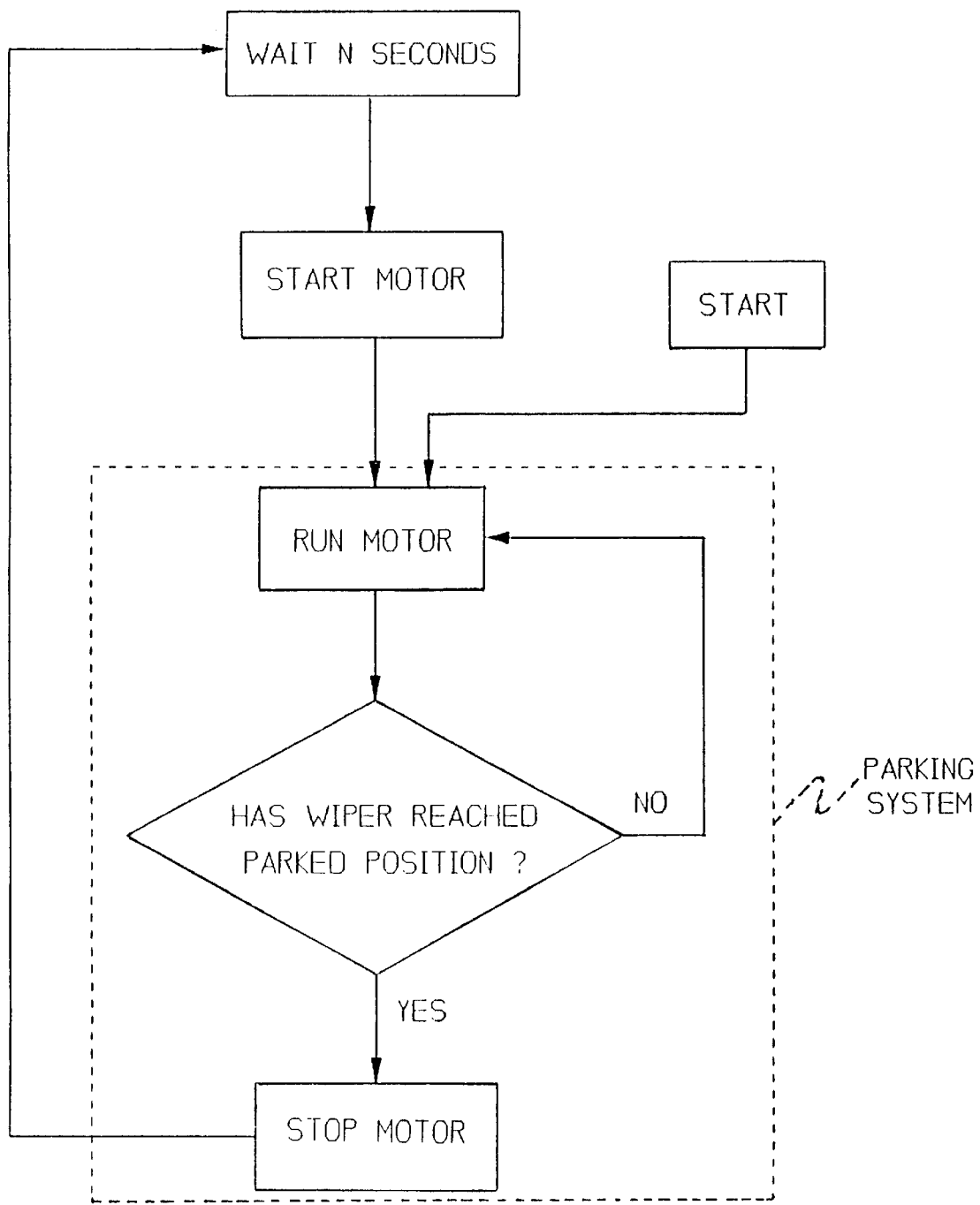
FIG. 4A illustrates logic which the invention implements.

FIG. 4 illustrates one form of the invention, and illustrates normal running mode. Battery voltage, B+, is applied to terminal T3, as indicated, by a switch (not shown) under control of the driver. This voltage causes Darlington pair Q1 to turn ON, thereby passing current I1. This current actuates relay K1, causing it to connect terminals T6 and T7 together, as indicated by the position of the reed R. Consequently, battery voltage, B+, is applied to terminal T7, causing the motor to run continuously.

Other components in FIG. 4 drawn in phantom, to indicate that they are not active at this time.

Intermittent Mode

Figure 5:
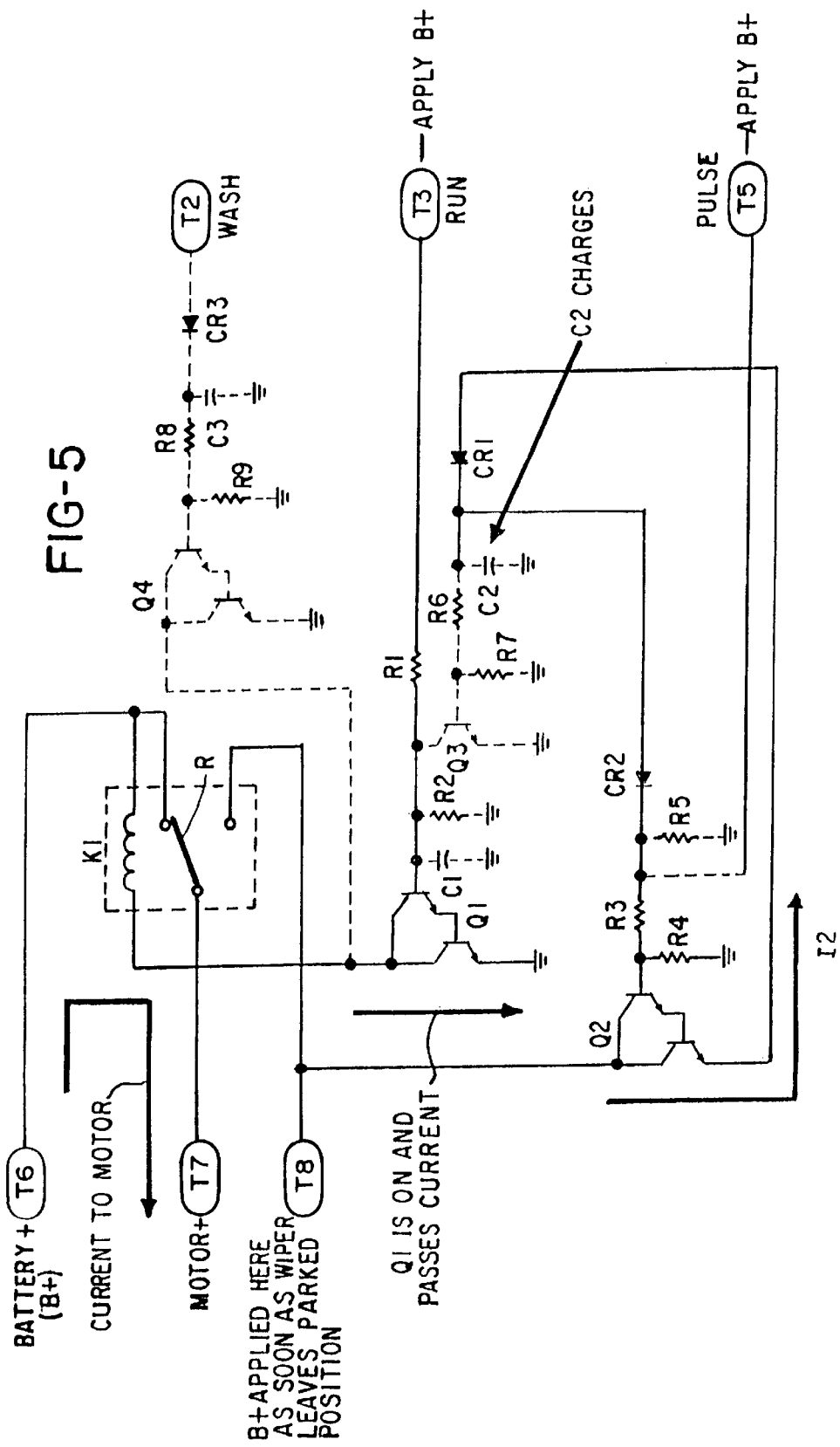

In FIG. 5, battery voltage B+ is applied to both terminals T3 and T5. Several events now occur. First, Q1 turns ON, causing relay K1 to deliver current to the motor, as indicated.

At the same time, Darlington pair Q2 also turns on, delivering current I2, which charges capacitor C2, as indicated. C2 becomes fully charged almost instantaneously, because the resistances in the path of I2 (i.e., the collector-emitter resistance within Q2 and the resistance of diode CR1) are very small. When C2 becomes fully charged, transistor Q3 turns ON.

Figure 6:
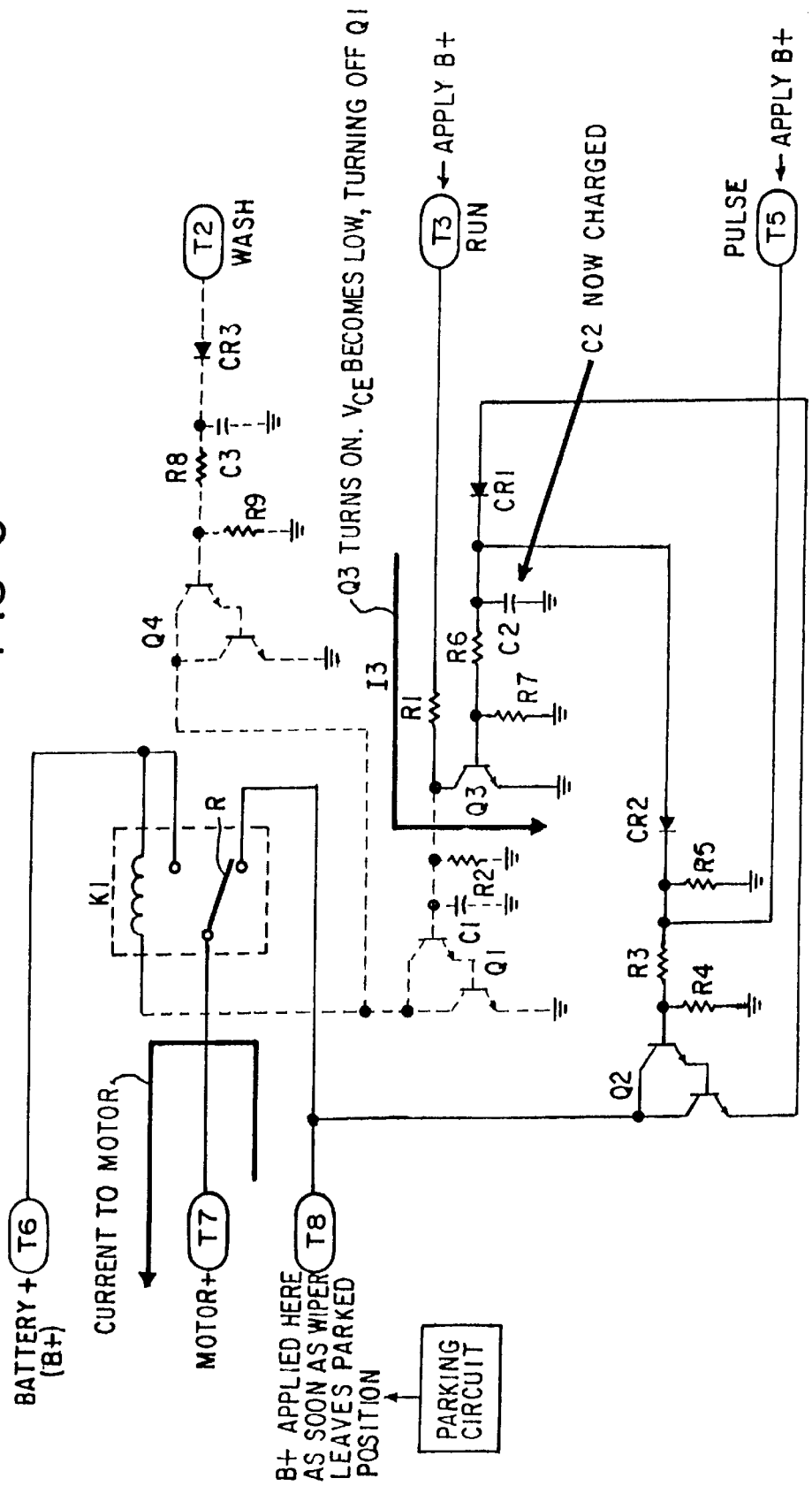

FIG. 6 shows that, when Q3 turns ON (which is allowed by the battery voltage B+ connected to the collector of Q3, via terminal T3), it passes current I3. The collector-emitter voltage of Q3 becomes very low, thereby pulling the base voltage of Darlington Q1 very low, thereby turning Q1 OFF, as indicated by the phantom drawing of Q1 in FIG. 6.

When Q1 goes OFF, relay K1 switches into the state shown in FIG. 6, wherein reed R connects terminals T7 and T8 together.

Terminal T8 is shown in FIG. 2A. As explained above, this terminal receives one of two voltages: (1) battery voltage, B+, whenever the wiper ARM resides outside the parked position, or (2) ZERO volts when the ARM becomes parked.

Figure 1A:
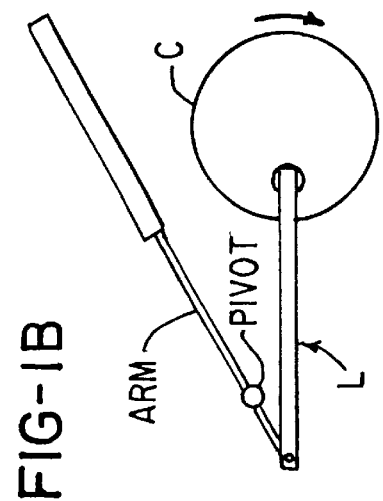
FIGS. 1A and 1B schematically illustrate a crank C which drives a wiper ARM.
Figure 2:
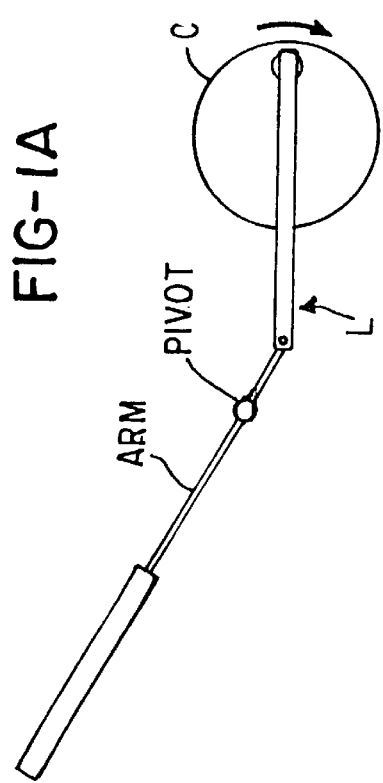
FIG. 2 illustrates a limit switch SW which detects parking of a wiper.
Figure 1B:
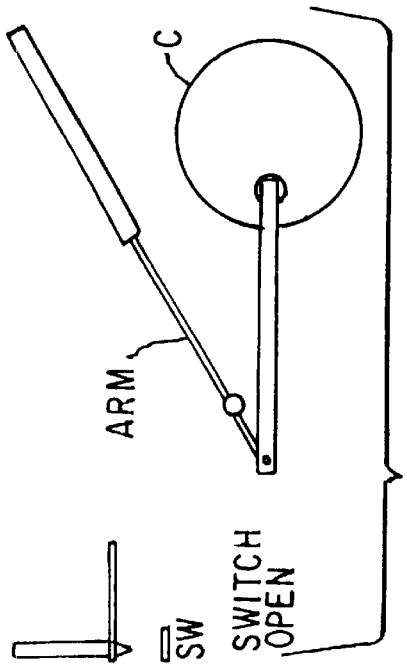
Figure 3:
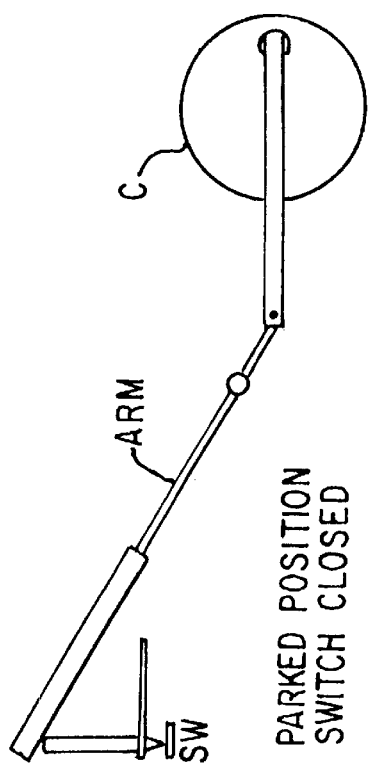
FIG. 3 illustrates how the limit switch SW of FIG. 2 opens when the ARM lies within its operating region, outside the parked location.

When transistor Q3 switches ON, switching Q1 OFF, the ARM is moving, and not parked. (At this time, T8 is connected to B+, as shown in FIG. 2A, and delivers power to the motor.) The wiper motor continues to run until the wiper ARMS (see FIGS. 1 and 2) reach the parked position (shown on the left of FIG. 2A). When they do, the PARKING CIRCUIT terminates current to the motor, by applying ZERO volts to terminal T8, as schematically indicated on the left of FIG. 2A.

Figure 7:
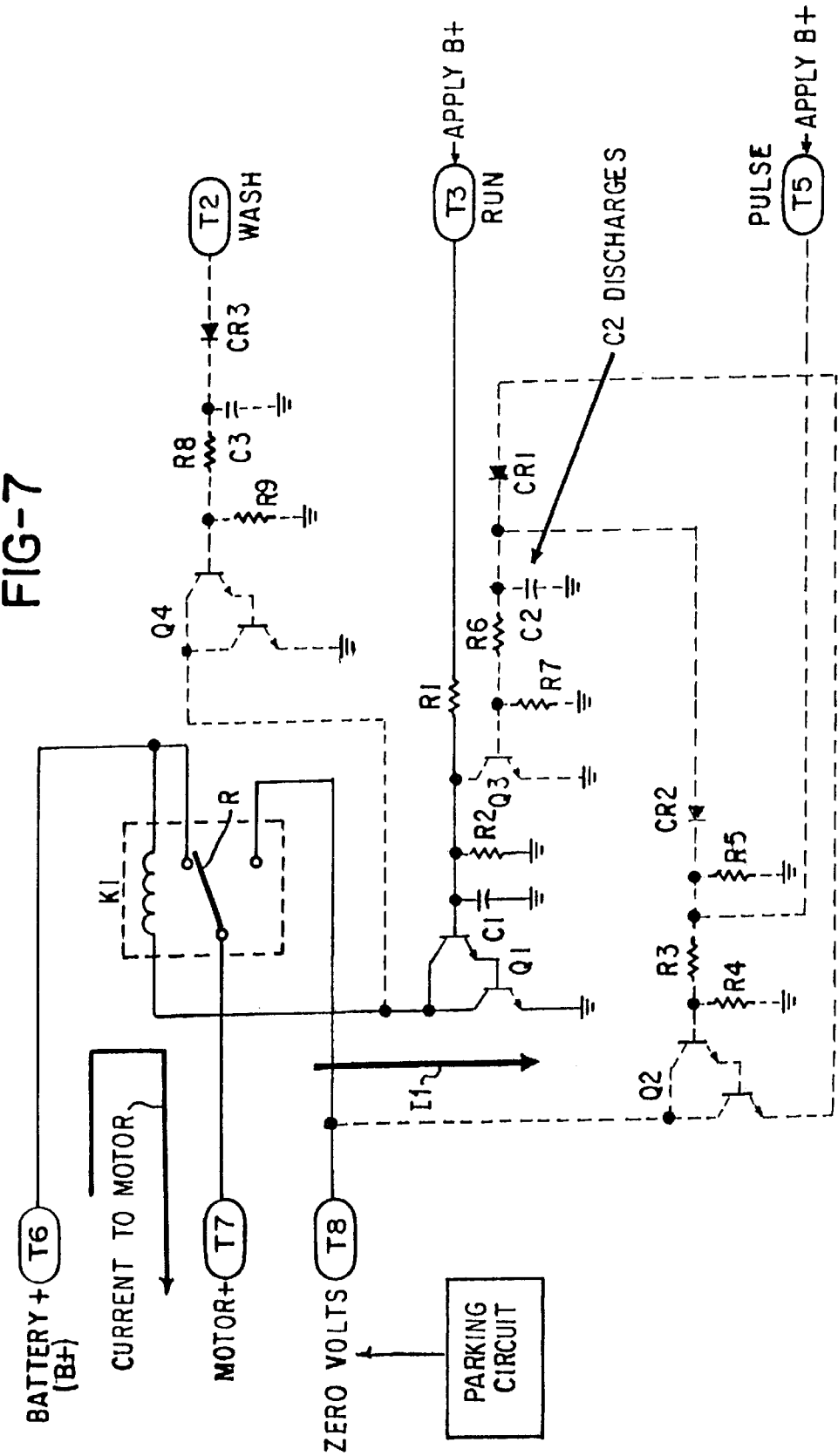

With ZERO volts applied to T8, Darlington Q2 now turns OFF, as indicated by the phantom representation in FIG. 7. With Q2 OFF, no current is supplied to capacitor C2, which now discharges, primarily through resistors R6 and R7, as indicated. When C2 discharges sufficiently, transistor Q3 turns OFF, as indicated by the phantom representation, thereby releasing the base of Darlington Q1, thereby allowing Q1 to turn ON, as indicated by the solid, heavy drawing. Now, Q1 again passes current I1, which actuates relay K1, which now connects terminals T6 and T7 together, as indicated by reed R. (The turning OFF of Q3 can be termed a RESUME 30 signal, because it causes the motor to resume running, after having been parked.)

Terminal T6 delivers battery voltage, B+, to the motor. The motor now withdraws the now parked ARMS from the parked position. The PARKING CIRCUIT detects this withdrawal, and applies B+ to terminal T8 (this application of B+ is not shown in FIG. 7).

The situation now is the same as in FIG. 4. The sequence described above, running through the sequence of FIGS. 4 through 7, repeats.

One View of Invention

The preceding events can be grouped as follows.
1. Start wiper motor. (Q1 in FIG. 5 turns ON).
2. Give control to the parking system. (K1 connects T8 with T7 in FIG. 6).
3. Park the ARM. (PARKING CIRCUIT in FIG. 7 senses parking and applies ZERO volts to T8).
4. Wait for an interval. (C2 discharges in FIG. 7).
5. Withdraw ARM from parked position, by starting motor. (After C2 discharges, Q1 turns ON in FIG. 7, causing K1 to connect T6 with T7.)
6. Go to step 2, and repeat steps 2 through 6.

Condensed Sequence

This sequence of events can be condensed (conceptually) to the following:
1. Withdraw the wipers from parked position.
2. Invoke parking function, and park the wipers.
3. Allow the wipers to remain parked temporarily.
4. Go to step 1.

Significant Features

Figure 8:
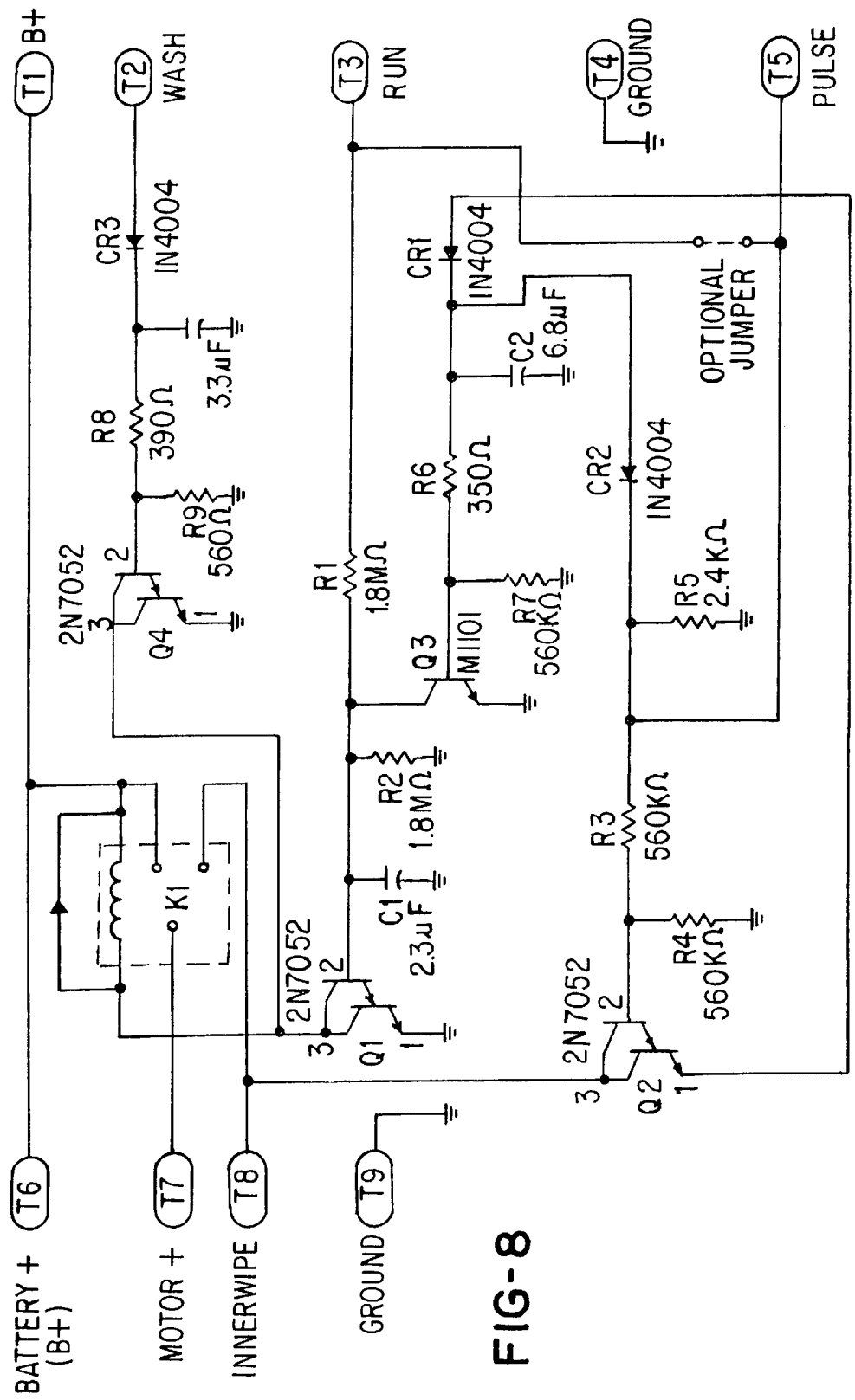
FIG. 8 is a more detailed form of the circuit of FIGS. 4–7.

1. FIG. 8 is a more detailed schematic of FIGS. 4–7, and provides additional information, such as component values and standardized part numbers (e.g., Darlington Q1 can take the form of part number 2N7052).

In FIG. 8, the diode D, shorting the ends of the coil in relay K1, serves to absorb voltage spikes which otherwise occur when current through the coil attempts to terminate.

Capacitor C1 serves to prevent relay chatter, because Q3 turns off slowly.

An OPTIONAL JUMPER can be added, which hard-wires terminals T3 and T5 together, thereby causing intermittent wiping action to occur at all times (except when washing, discussed below, is requested).
2. The duration of the temporary parking of step 3 in the "Condensed Sequence," above, is determined by the discharge time of C2. This discharge time is determined by the RC time constant of the discharge circuit. The resistances of this time constant are dominated by R6 and R7, in FIG. 8, as stated above. These resistances can be made variable, in order to allow the driver to control the duration of the park cycle, by varying these resistances.
3. A wash cycle can be invoked by applying B+ temporarily to terminal T2 in FIG. 7. This action charges capacitor C3 very rapidly, which turns ON Darlington Q4. Darlington Q4 actuates relay K1, connecting terminal T6 with T7, thereby delivering current to the motor.

Current is delivered to the motor until the voltage on C3 drops below the turn-on voltage of Q4. Preferably, the RC discharge time constant of C3 is set so that the motor runs for about three wiping strokes.

Of course, if a continuous voltage is applied to terminal T2, the motor runs continuously. Then, after the voltage to T2 is terminated, the motor continues to run until C3 discharges sufficiently.

A windshield washer pump, not shown, which sprays solvent on the windshield, is actuated directly by the voltage applied to T2. That is, when voltage is applied to T2, both the pump and the wiper motor operate. When the voltage is removed, the pump stops, but the motor continues until C3 discharges.
4. A preferred use of the invention is in a single-arm wiper used on the rear window of a van.
5. One view of the invention is that it alternates between two conditions:

A. Running the motor from power obtained from the parking system, as indicated by the power delivered from terminal T8 in FIG. 6.

B. Running the motor from power obtained from outside the parking system, as indicated by the power delivered from terminal T6 in FIG. 7.

6. The invention accomplishes intermittent wiping, parking or a wash cycle by the addition of a single relay, namely K1 in FIGS. 4–8. Viewed another way, the parking system relay serves multi-duty: it operates in the parking system, and it operates in the intermittent system and wash cycle.

Numerous substitutions and modifications can be undertaken without departing from the true spirit and scope of the invention. What is desired to be secured by Letters Patent is the invention as defined in the following claims.

What is claimed is:

1. In a windshield wiper system, which includes
   a) a motor and
   b) a parking circuit, which
      i) drives a wiper into a parked position, and then
      ii) terminates power to
   the motor, the
improvement comprising:
   a) circuit means, containing no more than one relay, which cooperates with the parking circuit, to provide intermittent wiper operation.

2. A windshield wiping system, comprising:
a) a parking control system, which delivers power until a wiper becomes parked;
b) a wiper control system, which includes
   i) means for sensing whether the parking control system is delivering voltage and,
      A) if so, issuing a RUN signal. which calls for routing said voltage to the motor;
      B) if not, issuing a RESUME signal, after a delay; and
c) a power delivery system, which receives the RUN and RESUME signals, and
   i) routes the voltage to the motor in response to either the RUN or RESUME signals; and
   ii) blocks the voltage from the motor when neither the RUN nor the RESUME signals exist.

3. A control system for a windshield wiper, driven by a motor, comprising:
   a) a relay (K1), which
      i) connects one input (T6) to a first output (T7), when held in a first state; and
      ii) connects a second input (T8) to the output (T7), when held in a second state;
   b) a switch (Q1), for
      i) driving the relay (K1) into the first state, when closed; and
      ii) driving the relay (K1) into the second state, when open;
   c) a parking circuit, which
      i) causes a first voltage, sufficient to actuate the motor, to be applied to the first input (T8), when the wiper resides within an operative position; and
      ii) causes a second voltage, not sufficient to actuate the motor, to be applied to the first input (T8), when the wiper resides within a parked position;
   d) means for
      i) sensing when the parking circuit applies the first voltage to the first input (T8) and, in response, opening the switch (Q1);
      ii) sensing when the parking circuit applies the second voltage to the first input (T8) and, in response, closing the switch Q1, after a delay,
wherein the motor runs continuously, except during said delay, when it does not.

4. In a windshield wiping system, which includes a parking system which (1) parks a wiper, and then (2) terminates power to a wiper motor, the improvement comprising:
   means for repeatedly invoking a wash cycle or park system using a single relay.

* * * * *